United States Patent Office 2,993,023
Patented July 18, 1961

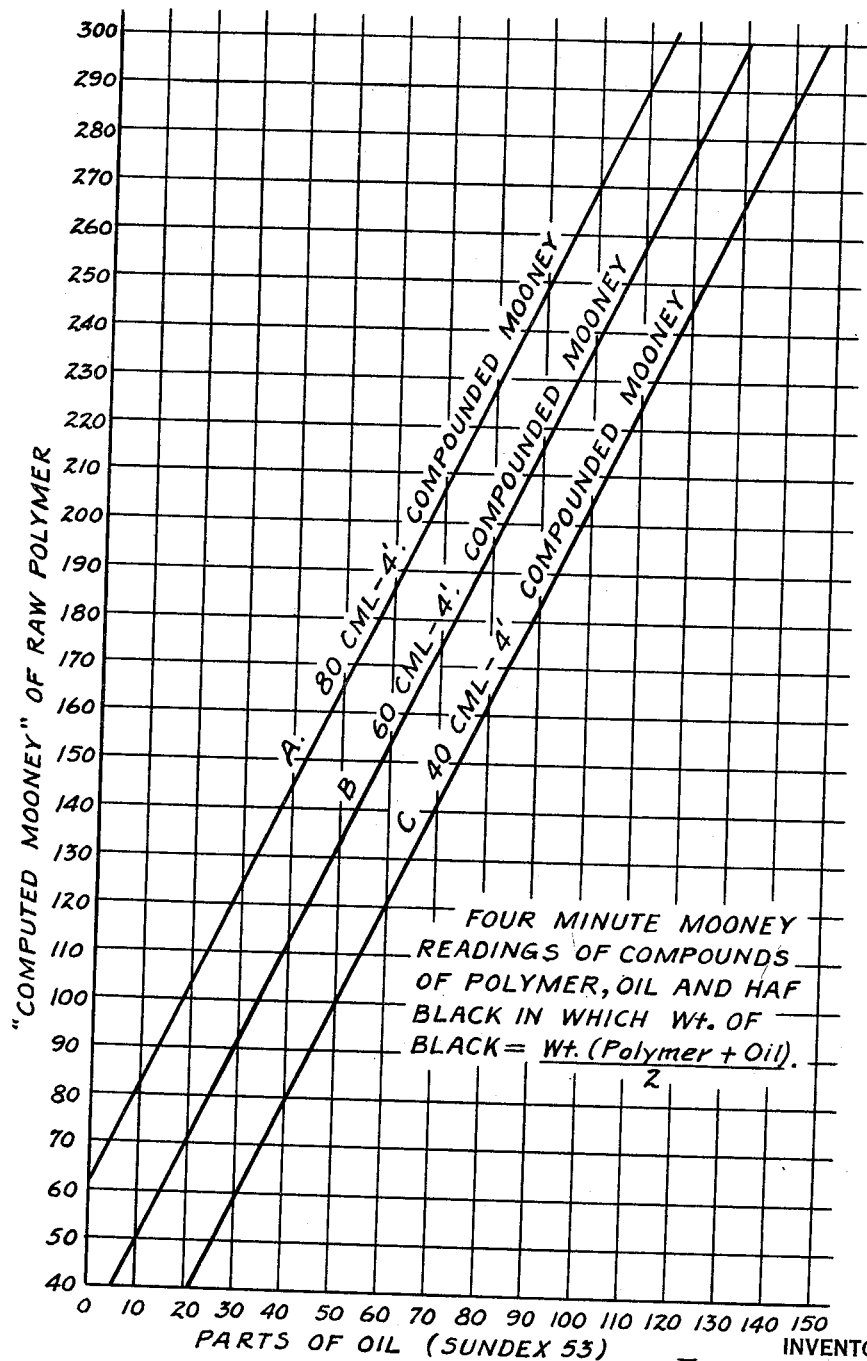

2,993,023
RUBBER COMPOSITION COMPRISING A CONJUGATED DIOLEFIN POLYMER AND AN ETHER OF AN ALKANOL AND A PHENOL
Emert S. Pfau, Cuyahoga Falls, Gilbert H. Swart, Coventry Falls, and Kermit V. Weinstock, Akron, Ohio, assignors to The General Tire and Rubber Company, Akron, Ohio, a corporation of Ohio
Filed May 4, 1953, Ser. No. 352,746
7 Claims. (Cl. 260—33.2)

The present invention relates generally to the manufacture of pneumatic tires of the type suitable for use on various types of motor vehicles, airplanes and the like and to a rubber compound for producing same. It particularly relates to such types of tires having extruded tread portions of an exceedingly tough synthetic rubber, and to the method of making the basic synthetic rubber stock therefor.

It is an object of the present invention to provide an extruded tread for pneumatic tires and a basic rubber compound for same, which tread has improved low temperature properties combined with lower cost than those heretofore produced and is useful in arctic regions.

It is another object of the present invention to provide a mass of a rubber compound and method of making such compound which when vulcanized does not stiffen in the coldest climates, which has improved flexibility at low temperatures combined with good abrasion and has other desirable physical properties.

It is a further object of the present invention to provide pneumatic tires having properties superior to those presently prepared which can be produced in volume utilizing the usual rubber machinery and which use less rubbery polymer.

In a tire, factors of adhesion of the plies, adhesion of the splice and uniformity of extrusion are of controlling importance and prior to our invention high oil or plasticizer in a rubber stock was considered a detriment to such factors.

Only a few types or a few varieties of the many types of synthetic rubber have been considered suitable for the manufacture of pneumatic tires and in particular the treads of such tires. This is because the rubber characteristics or qualities for tire treads are exacting and difficult to meet. Tire treads must be of uniform weight and cross-section; they must wear well and resist cracking both due to flexing and light; they must have substantial tensile strength and toughness. These qualities are had only in rubber compounds of the highest quality. Only highest quality rubber compounds are therefore used for good tires, whereas in mechanical goods and especially in rubber footwear, cost per unit of compound weight and not quality is the controlling factor.

Even though quality is of prime importance in tires, it is essential that tires be capable of being made in volume and to make tires in volume it is necessary that the rubber compounds used be capable of extrusion through an orifice (including calendering which is, in fact, extrusion through a die having rotating sides). It is only by such extrusion processes that tire treads have been made in volume and with uniformity.

Naturally, the rubber must be rendered sufficiently plastic for extrusion by apparatus of a rubber factory. Synthetic rubbers may be produced in a relatively tough state or in a relatively more plastic state as desired by simply regulating the percent of modifier. For example, a long chain mercaptan may be present in the mixture and the polymerization stopped at a point where the desired rubber is obtained. Larger amounts of mercaptan and lower degrees of conversion give more plastic synthetic rubbers with less cross-linking or gel formation.

Tough rubbers have always been broken down by long mastication or heat softening to a plastic or extrudable state before they are used in preparing tires for sale. This even though it has long been known that by an expensive and inefficient press molding operation (as distinguished from extrusion where material is forced through an orifice) a tread or at least a portion of a tread may be made without such breakdown or a molecular degradation necessary for extrusion and that treads of such non-broken down rubber have a much higher abrasion resistance than those of the broken down rubbers.

The earliest synthetic rubbers were made before the discovery of the effects of mercaptans and other modifiers and were therefore so tough that they could not be processed in the ordinary factory mill without extensive plasticization. Plasticization may be and was generally accomplished by extensive mastication and/or heat softening to cause degradation or break-up of the molecules of the rubber. After this molecular degradation was had, plasticizers usually in amounts of 15 percent or less were added to the rubber to further increase plasticity.

Inasmuch as the use of plasticizers or softeners in rubber compounds has been shown to be undesirable and to result in marked deterioration in physical properties, the use of appreciable amounts of liquid plasticizers in rubber compounds of the quality required for pneumatic tires was not even considered or if considered, was never found to be useful. This reasoning was applied even to certain mechanical goods where quality was important. In tire treads the maximum amount of softener tolerable has been about 15 percent based on the weight of the rubber and only 5 to 10 percent is usually used. Very recent work has been directed to the softening of these tougher synthetic rubbers so that they can be used in a factory. The process used is to force air into the Banbury mixer to accelerate deterioration of the polymer. We are unaware of any advantage in the process as the polymer is so deteriorated. Work has also been done to deteriorate or break down the latex of tough rubbers in a vain attempt to the advantage inherent therein.

With the discovery of the effect of modifiers and aliphatic mercaptans which permitted the production of more plastic rubbers of the general purpose type, synthetic rubbers suitable for tires were produced directly in the plastic stage where they could be processed in the factory with little, if any, premastication. The general trend is now toward even more plastic rubbers. This trend and this procedure was adopted even though, as above indicated, it has long been recognized that the tough rubbers when carefully processed and broken-down to a very limited extent provided tire treads superior to those made of softer rubber. It was reasoned and generally believed that inasmuch as the rubber necessarily had to be plasticized or broken-down for factory processing that one might just as well start with a highly modified or soft rubber in the first instance and obtain the same end product.

In our prior application Serial No. 196,584 of which this is a continuation-in-part, it was pointed out that the tough rubbers which were considered unprocessable and not suitable for making extruded tire treads in production may be mixed with relatively large amounts of one or more compatible oils or plasticizers to provide compounds of exceptional quality. Such compounds containing large amounts of softener have produced tire treads superior to those produced with the general purpose synthetic rubbers heretofore available and at very much reduced cost.

The present application is chiefly concerned with our discovery that a certain type of oily material (or plasticizer or softener) when mixed with the tough rubbers permits one to obtain, upon vulcanization, rubber articles of excellent quality and suitable for use at low temperatures such as are encountered at very high elevations or in arctic climate.

The oily softener is incorporated in the rubber before the rubber is deteriorated by mastication and preferably while the rubber is in a finely divided state such as is present in aqueous dispersions or in a crumb-like state with small particles which may be separated by a pigment such as carbon black. Mastication in the presence of large amounts of softener added in the stages of the mastication procedure prevent the breakdown of the rubber such as is had by the usual masticating procedures. The explanation appears relatively simple when it is postulated that all plastic flow is necessarily accomplished in high polymers by sliding of molecules over each other. As the molecules increase in size and become longer chains, the attractive force or interlocking of adjacent molecules or portions of molecules may be of greater strength than the primary valence bonds between atoms in the molecule especially under the oxidizing conditions present, with the result that when mastication occurs some of these primary valence bonds are ruptured and the molecules become shortened. This takes place in ordinary rubber mastication and is evidenced by the increased plasticity and by the decreased physical properties of the final vulcanizate as well as by a decrease in intrinsic viscosity.

It has been recognized that such degradation occurs, but as previously mentioned, it has been considered necessary for processability in the factory which is a controlling factor. When a compatible oily plasticizer or a compatible plasticizer, which is liquid or viscous at the mixing temperature, is incorporated into the tough rubber, our theory is that it apparently enters in between the molecules to lubricate them so that they slide more easily on each other so that they are not subjected to sufficient strain to rupture the bonds or the oil prevents oxygen attack and the polymer is not broken down or deteriorated to any appreciable extent as in the case where the mastication is accomplished in the absence of sufficient plasticizer for such lubrication or protection. Appreciable degradation of molecules by mastication is apparently only had when the molecules are sufficiently large for their intermolecular forces to be greater than the bond strength between molecules under oxidative conditions. After a given rubber has been deteriorated or plasticized to such an extent that the molecules are relatively small, mastication may be continued with no physical rupture of the molecules. It is, therefore, seen that degradation by mastication alone is much more severe in the high Mooney or very tough rubbers which have large molecules than in the case of the softer or lower Mooney rubbers.

As aforementioned the effect of liquid or solid plasticizers in large amounts is to deteriorate the properties of the ordinary compounds made from general purpose rubbers, particularly natural rubber. This is illustrated by FIGURE 1 of the drawing of said application Serial No. 196,584 filed November 20, 1950 which shows the properties of an ordinary natural rubber tread compound having varying amounts of a rubber plasticizer therein. A comparison of the properties of the vulcanizates from such rubber compounds shows that as the plasticizer is increased the properties become progressively worse.

In the case of the high Mooney or tough rubbers with which the present invention is concerned, it is found that some of the properties of a vulcanizate prepared from rubber compounds having a plasticity sufficient for processing are even improved by the addition of the oil plasticizers. Tough rubbers of which the present invention is concerned, which are vulcanizates of a factory processable compound, form articles such as tire treads which are improved with increasing addition of oily material until a certain maximum is reached after which deterioration begins. Apparently, the deteriorating effect of the plasticizer is less than the improvement caused by the preventing of bond rupture during mastication through molecular separation insulation until the amount of plasticizer becomes quite large. It is, therefore, seen that properties at least as good as those obtained from the standard factory processable polymers without any plasticizer whatsoever may be obtained with relatively large amounts of inexpensive plasticizer or softener providing the rubber has sufficient toughness or high Mooney plasticity.

In forming rubber compounds in accordance with our invention, it is unnecessary and we have found it undesirable, to masticate and break down the high gel or high Mooney rubber so that it forms a compact or plastic mass prior to the addition of the oil, as was the general compounding procedure in the past.

In order to obtain maximum advantage from the tough high Mooney rubbers, these should be combined with oily material when in the finely divided state so that the oil can enter and be absorbed between molecules of the rubber to facilitate slippage one on the other before they are broken-up by mastication. If the high gel or high Mooney rubbers are obtained in the form of a large mass, they should, for best results, be pulverized or granulated to a powdery or crumblike state prior to contact with the oil. Such may be accomplished without deteriorating the rubber. General purpose low Mooney rubbers are known as standard GR–S rubbers, namely, Government Reserve Synthetic rubbers which are copolymers of butadiene and styrene having at least 50 parts of butadiene with the remainder styrene the Mooney viscosity of which is in the region of 50. In contrast to such low Mooney rubbers the high Mooney rubbers, when masticated in a Banbury mixer, will usually form a pulverant mass because of the lack of plasticity. Frequently, however, this is not the case. In such cases pulverization of the entire material may be accomplished by adding small amounts of carbon black or other pigment with the rubber before plasticization has occurred so that the rubber particles are insulated from each other and prevented from being packed together as they are formed by the mixing apparatus. When the required amount of oily material or plasticizer is added at the time material is in a finely subdivided condition it is uniformly absorbed and best results are obtained. Addition of large proportions of the oil used in the practice of the present invention to a large solid mass of rubbery polymer makes it more difficult to produce a homogeneous compound. When the rubbers are in the finely divided state, they are rapidly swelled by the oil without deterioration and the rubber particles thereafter readily agglomerated to form a plastic mass.

By utilizing our preferred procedure, factory processable rubber compounds may be made in the very short time commensurate with ordinary procedures based upon the relatively highly modified and easily processable commercial synthetic rubbers. The rubber articles such as tire treads produced from the compounds having large amounts of oil are equal to and in many cases considerably superior in properties to those produced from conventional mixes.

When the rubber is available in the form of a latex, the oily plasticizer is preferably first emulsified and incorporated in the latex in the emulsified form and the mixture suitably coagulated. Preferably a so-called shock method of coagulation is used wherein the coagulable latex-oil emulsion mixture is passed into a large mass of coagulating medium such as salt and acid.

Unemulsified oily plasticizer may also be incorporated into the wet coagulum or crumb even in the presence of free drainable water and it is found it will be selectively absorbed even in the presence of such water.

In the compounding of the synthetic rubber-oil mixtures (oil being used generically to include compatible plasticizers and softeners generally) the total quantity of oil plus synthetic rubber is considered to be rubber. By this method compounds formed in accordance with the present invention generally have hardness and physical characteristics similar to normal compounds made from commercial easy processing synthetic rubbers. To illustrate this, a good tread compound having 100 parts of rubber and 50 parts of carbon black generally gives properties which are desirable. Using tough rubber-oil combinations with 100 parts of rubber and 100 parts of oil, we would utilize 100 parts of the carbon black for about equal hardness and comparable properties.

Proper characterization of a given polymeric material may not always be made directly by means of a Mooney Plastometer reading on the raw polymer, as gel content, gel distribution, and molecular weight affect the polymer and are not indicated by a Mooney Plastometer. When a polymer is exceptionally tough so that it would have a Mooney reading about 120, slippage between the rotor and polymer frequently occurs with the result that the Mooney reading may be in error and not reliable. Furthermore, when the tough particles are distributed within softer particles of a rubbery polymer or when a non-homogeneous or a gel containing polymer is had, the Mooney plasticity reading frequently fails to characterize the polymer. Thus, while a Mooney plastometer is satisfactory in distinguishing between rubbers having no gel but of varying molecular weights until the Mooney reading is about 120 (where slippage or tearing may occur), it fails to distinguish between such rubbers and rubbers having substantial gel content. Gel containing rubbers require substantially increased amounts of plasticizer.

We have found that in any given polymer modified so as to have substantially no gel, the amount of oil required to obtain a given compounded plasticity varies directly with the Mooney plasticity and directly with the intrinsic viscosity. Thus, there is a substantially straight line relationship between the amount of a given oily plasticizer required to obtain a given compounded Mooney and the raw Mooney reading providing a given carbon black such as a fine reinforcing furnace black for example "Philblack O" (a structural type of fine high abrasion furnace black of the Phillips Petroleum Company) is utilized and the amount of the carbon black is equal to a given percentage of the total weight of rubber plus oily plasticizer say 50 percent of the total of these two materials. We have also found that the compounded Mooney of a given polymer varies in approximately a straight line relationship with the amount of a given oily plasticizer contained therein. If therefore, the polymers are of a non-gel type, and vary only by molecular weight as indicated by intrinsic viscosity measurements, then the curves obtained by plotting parts of oil necessary to obtain a given compounded Mooney (CML-4') versus measured raw Mooney of the polymer are approximately parallel lines especially when the accuracy of duplication and measurement is considered. We have made use of this fact as hereinafter further explained to develop the term "computed Mooney" which applies to all synthetic rubbery polymeric materials, regardless of how they are obtained. The "computed Mooney" of a gel-containing polymer is the true Mooney of an equivalent of a gel free polymer. In the drawing calculated or "computed Mooney" is plotted versus parts of oil (Sundex 53) required in the various gel free polymers to obtain compounded Mooney values of approximately 40, 60, and 80 as shown by lines C, B, and A with a short mixing cycle of not more than 12 minutes as hereinafter described. The computed Mooney and the measured raw Mooney are the same within accuracy of measurement at the lower values, i.e., below 120 for these gel free polymers.

In order to properly prepare tires and particularly extruded treads of tires, the compounded Mooney of the compounds used should generally lie between 40 and 80. When the rubber compound is too plastic (too low a Mooney, for example much below 40) difficulty is had in holding shapes and when the compound is not sufficiently plastic, i.e., has over 80 Mooney, great difficulty is had in overheating and scorching in the extruding operation as had in a calender, tuber or the like machine necessary for forming extruded tire treads of uniform section. It is preferred that the compounded Mooney of the rubber compound be within the range of 50 to 70. Line B, the curve for compounded Mooney values of 60 is therefore squarely in the center of the range preferred for factory processing. The slope of this line was obtained by plotting the measured raw Mooney reading of gel free polymers against the amount of oil required to obtain a compound with a 60 CML-4' (compounded Mooney of 60 measured with the large rotor at four minutes). Slopes and positions for 40 CML-4', and 80 CML-4' lines were obtained in the same manner except that the compounds were made to 40, and 80 compounded Mooney respectively. One may find "computed Mooney" of a given polymer utilizing the graphs of FIGURE 2 by preparing a carbon black mixture with a given amount of oil utilizing the mixing procedure described below and measuring the Mooney of the compound in the ordinary manner using the large rotor of a standard Mooney Plastometer and reading the value at four minutes.

If the measured four minute compounded Mooney of the compound falls in the neighborhood between 40 to 80 i.e., near any of lines A, B, and C the "computed Mooney" may be simply read from the scale designated "computed Mooney" using standard interpolation procedures. If the measured compounded Mooney is substantially removed from the range of 40 to 80 another compound with greater or less oil may be prepared showing a compounded Mooney closer to this range and the amount of oil and actual Mooney level may thereupon be read by interpolation procedures.

The mixing procedure used for evaluating a polymer may, of course, affect the plasticity of the compounds obtained with a given amount of oil or softener. Longer mixing times, particularly in the presence of insufficient softener will considerably deteriorate the polymer and result in lower Mooney. Even in the presence of substantial amounts of softener the substantially increased mixing times have slightly adverse effects on the polymer. If, therefore, in preparing a factory batch insufficient oil has been added to provide the processability necessary for the factory operations, increased processability may be had by remixing the material without any additional oil.

In preparing rubber compounds for evaluation the tough rubber is incorporated in a warm laboratory Banbury mixer (approximately 200° F.) worked for about one minute whereupon the tough rubber tends to break into fine crumbs which will not work into a cohesive mass in the Banbury mixer. The oil is added in one or two increments depending on the amount of softener used and worked for four to six minutes. The oil should preferably be absorbed in the rubber before any carbon black is added, but the black can be added before the oil is completely absorbed if desired. When the Mooney polymer fails to break-up into a fine crumb in the Banbury mixer a small amount of the black may be added initially to insure the formation of a fine crumb. The carbon black is added in several increments and worked four or five minutes until a fairly cohesive mass is obtained. Cold water is preferably circulated through the Banbury mixer during the carbon black addition in order to prevent excessive temperature rise. The total mixing time should be only that required to obtain a cohesive mass. The mix should immediately be placed in a cold tight laboratory mill (6" x 12" rolls) and milled for two minutes at .050 inch separation of rolls allowed to cool one-half hour and the compounded Mooney determined.

When the rubber compound is to be used for the production of rubber articles the usual compounding ingredients may be added on a second pass through the Banbury mixer requiring about two to four minutes for the addition of the materials.

We have found that for any given "computed Mooney" reading or for any given actual measured Mooney in a given type of polymer there is a minimum amount of oil which is required for satisfactory processing without long and uneconomical mastication cycles and mixes. When the rubber into which the oil or other plasticizer is incorporated has a computed Mooney of 90 about 30 parts of oil or other liquid softener is usually required for each 100 parts of rubber to obtain a 60 Mooney compound (60 CML-4') and 20 parts of oil are required to obtain a 70 CML-4' which is on the less plastic side of the more desirable factory processability range. Where the benefits of the present invention become more impressive i.e., at "computed Mooneys" above 115, at least 30 parts of total oils or plasticizers are usually required to obtain a factory processable 70 Mooney compound and about 40 parts for a 60 Mooney compound using the 50 parts of black per 100 parts of rubber. When the "computed Mooney" plasticity (if the compound is gel free and prepared at low temperature) or when the measured Mooney is about 120, at least 35 parts and preferably about 40 parts is desirable in order to provide the desired factory processability. When the "computed Mooney" plasticity of the rubber is 150 or above, at least 45 to 50 parts of the oil or oils are required to obtain the same processability, and as much as 75 parts by weight of oil or oils or plasticizers may be present per 100 parts by weight of a synthetic rubber without giving tire treads having properties inferior to those made from standard GR-S rubber as presently manufactured. Even more oil, say 100 parts may be used when the black or pigment content is increased above the 50 percent by weight of oil plus polymer which loading we have found to be exceedingly satisfactory. When the Mooney plasticity reads about 150, 50 to 75 parts of oil are generally most desirable for high quality tire treads. As much as 200 or even 250 parts of oil or other plasticizer may be used in some compounds with 100 parts of the toughest rubbers to obtain products of surprising value combined with low cost.

It has been our experience that synthetic rubbers having a computed Mooney of appreciably over 70 cause great difficulty in factory handling and have been considered undesirable for factory use without premastication or deterioration treatments. When the computed Mooney is 80 or above, factory handling according to prior methods has been substantially impossible. The maximum benefits of the present invention are obtained with synthetic rubbers having computed Mooney much above those which are considered useable in factory production although substantial benefits of the present process are obtained when the computed raw Mooney of the synthetic rubber used is as low as 85.

Greater benefits are obtained in accordance with the present invention when the computed Mooney of the raw polymer is 100 or more as the amount of oils or plasticizer used to obtain substantially the same properties at room temperature is considerably increased without disadvantage and the low temperature properties of the rubber compound when the preferred low temperature plasticizers, such as a derivative of Cardinol (the alcohol obtained from cashew shell oil) or mixtures of such derivative with dioctyl adipate, dioctyl sebacate or other oily plasticizer, are used are improved with increased plasticizer content. The major benefits of the present invention are obtained when the Mooney plasticity is more than 115 or the measured Mooney of a gel free polymer is more than 115, all Mooney being measured with a large rotor at four minutes in accordance with standard procedures.

We preferably prepare polymers with Mooney plasticity of 150 or more in order to use large volumes of inexpensive oil and obtain the tread wear inherent in these unbroken-down polymers. It is as aforementioned, preferred that these very high Mooney rubbers are polymers prepared by low temperature polymerization processes utilizing a highly accelerated system.

The rubber should preferably be homogeneous or if present in mixture with other rubbers such as those of the general purpose type, should constitute a major portion or sufficient proportion such that the computed raw Mooney reading of the mixture is at least 85.

The intermolecular forces of the higher Mooney rubbers with which the present invention is concerned must be greater than the intermolecular forces of the lower Mooney rubbers since attraction of plasticizer would seem to be the same in each instance. So it is readily seen that the compatible plasticizer should be somewhat more readily absorbed by lower Mooney than by higher Mooney synthetic rubbers.

The softer rubbers with large amounts of plasticizer may in turn plasticize the tough rubbers when the "computed Mooney" of an uncompounded mixture, i.e., four minute Mooney reading, without the softener, is much less than 85. The preparation of the softer rubber diluted with sufficient softener to become a composite plasticizer may become too great to be effectively disposed between tough polymers and a heterogeneous compound may result. It is apparent for this reason that any artificially created mixture of separately produced high and low Mooney rubbers should have a minimum computed Mooney of 85 to obtain advantages of the present invention. More benefits are of course obtained when the computed Mooney of the mixed polymer is well above 90 or 100 such for example 115 or above.

In preparing mixtures of high Mooney with low Mooney polymers the two materials shall be of about the same plasticity when mixed in order to insure homogeneous mixture. The high Mooney rubber is preferably mixed with the required amount of oil and plasticizer as aforementioned before it is combined with a lower Mooney polymer. Preferably, both polymers are mixed with the required amount of carbon black prior to combining them. However, reasonably good results are obtained when carbon black masterbatches of the lower Mooney polymer are incorporated with the high Mooney polymer prior to admixing the latter with the oil or plasticizer. The carbon black stiffens the lower Mooney materials particularly when the masterbatch is formed via the latex route and the lower Mooney polymer is unmasticated so that it may have substantially the same plasticity as the high Mooney polymer. It is emphasized, however, that the advantages of the present invention are reduced as the proportion of the high Mooney rubber in a mixture is reduced.

The synthetic rubbers to which the present invention relates are hydrocarbon polymers of conjugated diolefinic compounds such as butadiene, isoprene, dimethylbutadiene and others having not in excess and preferably less than eight carbon atoms. Hydrocarbon-oil compatible (non-oil resistant) copolymers of one or more diolefinic compounds such as those aforementioned with one or more copolymerizable mono-olefins such as the arylolefinic compounds such as alpha-methylstyrene, 3, 4 - dichloro-alpha-methylstyrene, p-acetyl-alpha-methylstyrene, and including the arylvinyl compounds such as styrene and halogenated and nuclearly methylated styrenes such as 2, 5 or 3,4-dichlorostyrene, 3,4-dimethylstyrene, 3-chloro-4-methylstyrene and unsaturated polymerizable ketones such as methylisopropenyl ketone, and methylvinylketone, the esters of acrylic and methacrylic acids including methylmethacrylate and methylacrylate. The hydrocarbon copolymers and hydrocarbon polymers are preferred for combination with the hereinafter described low temperature plasticizers for preparation of arctic rubbers.

In the copolymers the total proportion of butadiene and/or other conjugated diolefinic compounds is ordinarily at least 50 percent of the weight of the copolymer and at least 65 percent is preferred.

The plasticizers, which when mixed with the rubber of a computed Mooney of at least 85 and preferably higher, provides compounds which when suitably shaped and vulcanized gives articles with flexibility at sufficiently low temperature to permit their use in arctic regions, are liquid derivatives of the Cardinol, the phenol present in cashew nut oil.

The ether derivatives of this material especially the ether derivatives of Cardinol with an aliphatic alcohol of substantially not in excess of 8 carbon atoms are especially desirable in low temperature plasticizers.

The ether derivatives of Cardinol are known generally in the trade as Cardolite 625 which is an especially desirable plasticizer and is an ethylene ether derivative of Cardinol. The derivatives of Cardinol may be the sole plasticizer as they provide vulcanized compounds with good physical properties including good tensile and excellent flexibility at extremely low temperatures.

The esters of aliphatic dicarboxylic acids of 6 to 10 carbon atoms such as adipic, azelaic and sebacic with monohydric alcohols of 6 to 10 carbon atoms when mixed with the above high Mooney rubbers also provide compounds with good low temperature flexibility but the physical properties such for example as tensile strength are substantially lower than those obtained when the plasticizer is a hydrocarbon oil or a Cardinol derivative as above described.

The physical properties are reduced in accordance with the amount of such ester plasticizers present and when the total plasticizer is, for example, dioctyl adipate one may obtain in a hydrocarbon rubber dioctyl adipate-black compound a tensile of only 1500 lbs. per square inch compared to 3000 to 3500 lbs. per square inch when the entire plasticizer is Cardolite. The Cardolite may be mixed with polyester plasticizer to obtain substantially improved low temperature flexibility together with physical properties such as tensile which are intermediate between the compounds obtained with Cardolite and physical properties of the compounds obtained entirely with the above-mentioned ester plasticizers.

When the derivative of Cardinol such as Cardolite is mixed with hydrocarbon oils such as Sundex 53, Circle Light or with resin, cumarone-indene, etc. the physical properties such as tensile strength, elongation, etc. at room temperatures may be unimpaired but the flexibility at extremely low temperatures is reduced as the percentage of Cardolite and/or the aforementioned plasticizers in the total plasticizer content of the composition is reduced.

It is, therefore, seen that Cardolite may be combined with other materials to obtain substantial improvements in the rubber mixes, but that the physical properties or the low temperature flexibility are impaired depending on whether the particular plasticizer used in conjunction with the Cardolite is an ester plasticizer or a hydrocarbon oil. The plasticizer should not boil below 450° F. and preferably should not boil below 550 to 600° F. Mineral oils, if used as part of the plasticizer present are preferably those having a low aniline point or high aromatic content especially when the rubber contains styrene or has appreciable amounts of aromatic components.

Even when the rubber is entirely hydrocarbon as in the case of GR–S rubber and polymers of diolefinic compounds such as polybutadiene or polyisoprene rubbers, some of the benefits of the present invention are obtained by the use of other plasticizing agents such as cumar resins, cumarone-indene and various mineral rubbers and the like. These may be substituted for a part of the oily softeners aforementioned to obtain special properties. Coal tar oils and the like may also be used for part or all of the plasticizer. The plasticizers listed below in Table 1 have been used in the practices of the present invention alone or in conjunction one with another. The hydrocarbon plasticizers, and phenols substituted by unsaturated aliphatic compounds as stated above give superior physical properties to the hydrocarbon polymers or hydrocarbon synthetic rubbers. The various plasticizers or oils are not therefore, equivalent even at room temperatures but we have found them useful in obtaining various desirable specific properties in the compounds formed from the high Mooney rubbers. The following are examples of the various types of plasticizers that may be combined with Cardinol derivatives. The identifying data for these plasticizers which are available in the United States under trade names, manufacturers or suppliers shown and the relative "heat loss" after exposing the oil for the time indicated at 300° F. is given. The numerals given for heat loss refer to the percent lost based on the weight of the original sample.

TABLE 1

| Oil | Manufacturer | Pour Point, °F. | Flash Point, °F. | Aniline Point | Boiling Range, °F. | Heat Loss at 300° F. 1 hr. | Heat Loss at 300° F. 3 hrs. |
|---|---|---|---|---|---|---|---|
| Sundex 53 | Sun Oil Co. Highly aromatic content heavy process oil type with chemical unsaturation. | 70 | 380 | 130° F. | | 3 | 6 |
| Dutrex 6 | Shell Development. Complex high mol. wt. aromatic and unsaturated hydrocarbons. No volatiles or asphaltic residue. | | | | +600 | 1 | 2 |
| Dutrex 7 | Shell Development. Hydrocarbon plasticizer of heavy process oil type. | | 440 | | | 1 | 2 |
| Circosol 2XH | Sun Oil Company. Hydrocarbons of high molecular weight derived from selected crude petroleum. Less aromatic than Sundex 53. | +10 | 430 | 181° F. | 700 | 1 | 3 |
| Phillips 9002 | Phillips Petroleum Company. Alkylated aromatic type hydrocarbon. | | | | | 12 | 37 |
| Cardolite 625 | Irvington Paint and Varnish Co. Cardanol stated to be the monophenolic component of commercial cashew nut shell oil. Cardolite 625 is ethyl ether of Cardanol. Some unsaturation in side chain. | | | | | 6 | 14 |
| Hercoflex | | | | | | 1 | 2 |
| (Octyl-decyl phthalate). | | | | | | 1 | 2 |
| Dioctyl phthalate. | | | | | | 2 | 6 |
| Liquid Poly B.D. | Phillips Petroleum Co. Low molecular weight polybutadiene. | | | | | 7 | 10 |

TABLE 1—Continued

| Oil | Manufacturer | Pour Point, °F. | Flash Point, °F. | Aniline Point | Boiling Range, °F. | Heat Loss at 300° F. 1 hr. | Heat Loss at 300° F. 3 hrs. |
|---|---|---|---|---|---|---|---|
| ASTM #1 | (ASTM Standard Oil) | | 470 | 124° C. | | 1 | 2 |
| ASTM #2 | (ASTM Standard Oil) | | 475 | 93° C. | | 1 | 3 |
| ASTM #3 | (ASTM Standard Oil) | | 350 | 70° C. | | 15 | 26 |
| TP90B | Thiokol Corporation. High molecular weight polyether, which is high boiling and has a butter-like odor. It is straw to brown colored, has a specific gravity of 0.97 and a boiling point of 330-360° C. at 760 mm. of mercury. | | | | | 4 | 34 |
| Sundex 96 | Sun Oil Company. Heavy process oil with chemical unsaturation and high aromatic content. | +10 | 430 | 181° F. | | 1 | 3 |
| Flexol 8N8 | Carbon & Carbide Co. ($C_7H_{15}COO-C_2H_4)_2NCOC_7H_{05}$). | | | | | 4 | 10 |
| Circle Light Oil. | Sun Oil Company. More volatile than Circosol 2XH and more aromatic hydrocarbons. It is an odorless, light-gold-colored oil having a specific gravity of about 0.92 and a Saybolt viscosity at 100° F. of about 155 seconds. | Below 0 | 325 | 157° F. | | 12 | 30 |
| Bardol B | Barrett Coal Tar oil. A refined coal tar distillate which is a yellow liquid having a specific gravity of about 1.00 to 1.04 and a distillation range of 230-310° C. | | | | | | |

The polymers having a high "computed Mooney" as hereinbefore described may be prepared by any of the conventional or known polymerization processes including emulsion and mass-free radical polymerization process, ionic polymerization processes such as processes utilizing ionic catalysts.

For example, in the catalytic process known as the "alfin process," the present invention may be used with great success. In the alfin process the monomers such as suitable for polymerization into a synthetic rubber are dissolved in pentane, or a like volatile hydrocarbon solvent, and an appropriate amount of a complex ionic catalyst is added, such as an alfin catalyst, the resultant polymer being of high molecular weight and being hard to mill. Such alfin polymer possesses, however, high tensile strength and excellent wearing properties, when formed into a tire tread in conventional manner. An alfin catalyst is a complex of the sodium compounds of an alcohol and olefin, for example, sodium propoxide-allyl sodium. More specifically, the monomer to be dissolved in the volatile hydrocarbon may be the butadiene or other diolefinic compound with or without a monolefinic compound, and the ionic catalyst may be an alkali metal alkyl such as a sodium alkyl complex with an ether and alcohol. The polymerization proceeds at a satisfactorily fast rate at room temperature or less. When modifying the alfin or ionic catalytic process above given in accordance with the present invention, the volatile hydrocarbon solvent is substituted in whole or in part by preferably a high boiling point mineral oil or similar oily plasticizer free of strong polar groups such as acids and the like, and there is thus obtained a plasticized rubber of very high molecular weight and excellent physical and chemical properties.

In accordance with a feature of this invention, the advantages gained in using an alfin catalyst can be obtained with the advantages herein set forth by proceeding with the alfin process (for example, as set forth in the article entitled "Butadiene Polymers and Polyisostyrene" in the American publication, Industrial and Engineering Chemistry, January 1950 issue, pages 95 to 102) but substituting the diluent used therein wholly or in part by an oily plasticizer according to the present invention. The oily plasticizer, particularly if it is a mineral oil plasticizer, an alkylated phenol ether such as Cardolite (when purified to remove any inhibiting or polar groups that may be present) or mixture of the two may be substituted for all or part of the diluent or solvent. The alfin rubbers have heretofore been considered undesirable because of their high molecular weight characteristics and the tremendous difficulty involved in breaking them down by milling procedures so that they could be formed into factory processable compounds. In accordance with the present invention such alfin rubbers may be produced directly in readily useable state or they may be produced in the same way as previously and the oil or plasticizer added in a Banbury mixer as above described.

Any of the various known carbon blacks may be incorporated in accordance with the present invention either in the latex or during the mastication procedures. The amount of carbon black for a tread compound is, if the plasticizers plus the synthetic rubber are considered all as rubber, substantially identical to that used in the standard methods where the carbon black is based on only the rubber present, if compounds of similar hardness are to be had. While any of the carbon blacks including the furnace blacks, channel black, and even thermatomic may be used to obtain compounds suitable for many purposes, the fine reinforcing furnace blacks, particularly those having some structure such as the aforementioned "Philblack O" and the super abrasion furnace blacks produce tire treads having outstanding properties and are, therefore, preferred. The compounds prepared from these fine reinforcing carbon blacks, SAF super abrasion furnace black and/or HAF (high abrasion furnace black) have properties which are superior to others. The amount of carbon black and/or other pigment such as zinc oxide, titanium oxide, the silica pigment known as Hysil and the like may vary very widely. Compounds or rubber mixtures without carbon black or with small amounts of carbon black and other pigments are suitable for many purposes including carcass compounds. Compounds with as much as 75 or 80 parts of carbon black based on 100 parts of the total of rubber plus oil are often suitable for high abrasion compounds.

In tire treads however, the amount of carbon black used is preferably about 30 to 65 percent based on the total amount of oil or plasticizer plus rubber present in the compound. Part of the carbon black may be substituted however by other pigments on the basis of equivalent surface area. Lignin incorporated into the latex as an alkaline solution and coprecipitated therewith may be used in amounts commensurate with the pigment content of the carbon black.

The present invention is, as aforementioned, especially suitable for the production of rubber compounds that exhibit high flexibility at low temperatures such as may be encountered in far northern (arctic) climates. While any of the polymers may be used in making rubber compounds, the hydrocarbon synthetic rubbers are as aforesaid generally preferred in tires and of the hydrocarbon rubber compounds those prepared substantially entirely from a diolefin such as butadiene are preferred particularly when the polymerization as aforementioned takes place at a temperature well below 50° C. and preferably not in excess of 60° F. superior results being obtained as the polymerization temperature is lowered (so-called "cold rubber").

While synthetic rubbers consisting essentially of polymerized butadiene and/or polymerized isoprene are the preferred polymers for preparing general purpose compounds suitable for arctic purposes and may be used with any plasticizers compatible therewith. The lower the pour point of the plasticizer the lower is the temperature at which the rubber has flexibility. However, mixtures of plasticizers even though of various pour points or even though some are semi-solid are generally superior to a single plasticizer in producing low temperature rubbers.

The following example in which parts are by weight illustrates the advantage had from the present invention in preparation of rubbers for cold climates and the differences obtainable by selecting plasticizers and amounts thereof.

*Example 1*

Rubber compounds were prepared with the plasticizers shown in the following Table 2. The following formula in which parts as always herein are by weight was used in evaluating the polymer:

FORMULA

| | Parts |
|---|---|
| Rubber (computed Mooney 175) | 100 |
| Philblack O [1] | 75 |
| Stearic acid | 2 |
| Zinc oxide | 5 |
| Sulfur | 2 |
| Santocure [2] | 1 |
| Softener or oil | Indicated in Table 2 |

[1] A fine furnace black.
[2] Santocure is N-cyclohexyl-2-benzothiazyl sulfenamide.

The compounds were masticated or mixed in accordance with the aforementioned recommended procedure for evaluating polymers and cured into standard test slabs. The slabs having optimum cure were tested as to their low temperature properties in accordance with the procedure recommended by the article by S. D. Gehman, et al., in the publication, Industrial and Engineering Chemistry, vol. 39, pages 1108–1115 (1947) for Gehman values. There is also shown in the following Table 2 a GR–S compound containing 5 parts of Para Flux softener which is generally recognized as a standard tread compound. The larger the Gehman value at the temperature indicated the better is the low temperature property of the compound. It will be seen that compounds may be prepared in accordance with the present invention with flexibility at temperatures of −75° F. By incorporating even larger amounts of oil such as Cardolite, high boiling esters and mineral oils mentioned still better Gehman values are obtained in stocks having desirable properties. The present invention is therefore highly satisfactory for the production of articles to be used in arctic regions. The temperatures of Table 2 refer to the number of degrees below zero.

TABLE 2.—GEHMAN DATA RELATING ANGULAR TWIST TO TEMPERATURE

| Parts Oil Used | −75° F. | −65° F. | −55° F. | −45° F. | −35° F. | −25° F. |
|---|---|---|---|---|---|---|
| 60 Sundex 53 [1] | | | 1 | 2 | 78 | 150 |
| 60 Circosol 2XH [1] | | | 10 | 28 | 109 | 160 |
| 60 Cardolite 625 | 5 | 23 | 65 | 154 | | |
| 60 Dioctyl Phthalate | | 5 | 33 | 90 | 145 | |
| 50 Circle Light Oil [1] | | | 3 | 68 | 116 | 133 |
| 40 Circle Light Oil [1] | | 2 | 3 | 36 | 135 | 148 |
| GR–S (a butadiene-styrene copolymer) (5 pts. Para Flux) [2] | | | 2 | 20 | 97 | 125 |

[1] Defined previously. See Table 1.
[2] Para Flux is a saturated polymerized hydrocarbon plasticizer which has a specific gravity of about 1.03 and a Saybolt viscosity at 100° C. of about 77 seconds.

*Example 2*

A polymer of butadiene and styrene containing 72 parts of butadiene and 28 parts of styrene was polymerized at 41° F. in the presence of 0.12 parts of a mixture of tertiary mercaptans. The conversion was 72 percent and the "computed Mooney" of the resultant polymer was 120.

A second polymer of identical butadiene and styrene content was polymerized under the same conditions except that the mercaptan content was reduced to .05 part of the mixture of tertiary mercaptans. The "computed Mooney" of the resultant polymer was 175.

The latices from each of these polymers were separately coagulated and dried to give a fine crumb of dry polymer. The separate crumbs obtained were compounded in the tire tread compositions in accordance with the following table:

TABLE 3

| | 9333B (Control) | 9344A | 9346A |
|---|---|---|---|
| Cold Rubber Masterbatch (100R–50B) | 150 | | |
| Cold Rubber Masterbatch 120 Mooney Polymer | | 100 | |
| Cold Rubber Masterbatch 175 Mooney Polymer | | | 100 |
| P.O. (Philblack-O) | | 75 | 85 |
| Sundex 53 [1] | | 35 | 60 |
| ZnO | 3.0 | 3 | 3 |
| Stearic | 3.0 | 1 | 1 |
| M.R. (Mineral rubber) | 8.0 | | |
| Para Flux [1] | 5.0 | | |
| (0.8 Santocure) [2] Acc. Master | | | 4 |
| (0.9 Santocure) [2] Acc. Master | | 4.5 | |
| Santocure [1] | 1.4 | | |
| BLE [3] | 0.8 | 0.8 | 0.8 |
| Stabilite [4] | 0.8 | 0.8 | 0.8 |
| Sulfur | 1.8 | 2.0 | 2.5 |
| Total | 173.8 | 222.1 | 257.1 |

[1] Defined previously.
[2] A 20% accelerator masterbatch of Santocure; this was added in the form of a masterbatch as is customary.
[3] A high temperature reaction product of diphenyl amine and acetone.
[4] Diphenyl ethylene diamine.

A standard cold rubber compound was used as a control. The formula for such standard compound is also shown in Table 3.

In preparing the compounds the polymer in crumb form was added to the Banbury mixer and allowed two minutes time to break the crumb into a finely divided form. The oil was thereupon added and about three minutes later the carbon black was added. When the batch temperature rose to 350° F. the batch was dropped. The accelerator, anti-oxidant and other materials were mixed into the rubber the following day by means of another pass through the Banbury mixer. The compounds thus produced were extruded through the orifice of a tubular machine into car treads of similar shape and size to prepare size 7.60 x 15 tires.

The physical characteristics of the compound were obtained by curing samples of each for the times indicated in the following Table 4.

TABLE 4

|  | Cure Time Minutes | 9333B— x556 | 9344A— Blend 2 | 9346A— Blend 3 |
|---|---|---|---|---|
| Cure, 287° F.: | | | | |
| 300% Mod | 15 | | 200 | 285 |
|  | 30 | 635 | 1,185 | 960 |
|  | 45 | 790 | 1,480 | 1,360 |
|  | 60 | 1,075 | 1,725 | 1,600 |
|  | 90 | 1,145 | 1,725 | 1,785 |
| Tensile | 15 | | 725 | 1,305 |
|  | 30 | 2,760 | 2,930 | 2,340 |
|  | 45 | 2,930 | 3,170 | 2,380 |
|  | 60 | 3,130 | 3,280 | 2,700 |
|  | 90 | 2,810 | 3,030 | 2,760 |
| Elongation | 15 | | 815 | 760 |
|  | 30 | 765 | 550 | 515 |
|  | 45 | 690 | 510 | 415 |
|  | 60 | 620 | 490 | 420 |
|  | 90 | 580 | 440 | 430 |
| Hardness | 15 | | 50 | 42 |
|  | 30 | 60 | 56 | 55 |
|  | 45 | 63 | 61 | 56 |
|  | 60 | 66 | 61 | 57 |
|  | 75 | 66 | 61 | 58 |
| Rebound | 60 | 56 | 57 | 57 |

The rubber stock prepared from the cold rubber masterbatch had a Mooney plasticity of 62 after extrusion, the Mooney plasticity of the stock produced from the 120 polymer was 74 after extrusion, and the Mooney plasticity of the compound prepared from the 175 Mooney polymer was 63 after extrusion, all plasticities being measured with the large rotor at four minutes.

Tires having treads applied on identical standard carcasses were made with each of the aforementioned treads. The tires were tested on a test fleet in the ordinary manner in the summer in California, U.S.A. The tread wear data is shown in the following Table 5.

TABLE 5.—TIRE TEST 2845 (SIZE 7.60 x 15)

| Tire No. | Miles | Miles/0.001 tread | Rating, percent |
|---|---|---|---|
| Cold Rubber Control—9333B | 8,400 | 48.6 | 100 |
|  | 16,800 | 50.3 | 100 |
|  | 18,890 | smooth | |
| 120 Mooney Polymer—9344A | 8,400 | 62.7 | 129 |
|  | 16,800 | 66.9 | 133 |
|  | 18,890 | 64.5 | |
| 175 Mooney Polymer—9346A | 8,400 | 60.9 | 125 |
|  | 16,800 | 62.9 | 125 |
|  | 18,890 | 60.8 | |
| Do | 8,400 | 61.3 | 127 |
|  | 16,800 | 63.2 | 127 |

Example 3

In order to show the advantage of high Mooney rubber oil mixtures when mixed with lower Mooney polymers such as standard GR–S (Government Reserve synthetic rubber) tires were prepared utilizing only 20 percent based on rubber of the high Mooney polymers in the compounds from which the treads were formed. The specific compounds are shown in the following Table 6:

TABLE 6

|  | A | B |
|---|---|---|
| Polymer A | 20 | |
| Polymer B | | 20 |
| GR–S Black Masterbatch (50 Philblack O–100 GR–S) | 120 | 120 |
| Sundex 53 | 16 | 12 |
| Philblack O | 17 | 15 |
| BLE | .8 | .8 |
| Stabilite | .8 | .8 |
| Zinc Oxide | 3.0 | 3.0 |
| Santocure | 1.0 | .9 |
| Sulfur | 1.9 | 1.9 |
|  | 180.5 | 174.4 |

In making the mixtures the amounts of GR–S black masterbatch of polymer A and polymer B indicated in the above table were placed in a Banbury mixer and blended together for two minutes, whereupon the oil indicated in Table 6 and black indicated in Table 6 was added. The mixing was continued for four minutes and the remaining ingredients added. The sulfur and accelerator were added on a second pass through the Banbury mixer. The total mixing time was nine minutes. The amount of oil used was that required for the high Mooney polymer plus the oil required to obtain a 60 to 70 compound Mooney.

Compounds thus obtained were extruded into tire treads and applied to standard tire carcasses, each having a plurality of plies extending from bead to bead and intermediate layers of rubber.

The tread wear rating of the various tires after 12,600 miles on test relative to a standard 100 percent GR–S control is shown in the following Table 7:

TABLE 7.—TIRE TEST DATA (SIZE 7.60 x 15)

Relative treadwear rating
20 percent polymer A (195 computed Mooney) ___ 104
20 percent polymer B (120 computed Mooney) ___ 112
GR–S control (50 Philblack O) _____ 100

The next preceding example shows that some advantages may be obtained with even relatively small amounts of polymer while mixtures in an ordinary easy process of rubber. It should be emphasized the main advantage and economies of the present invention are minimized by the small proportion of the high Mooney rubber mixture used.

While we have emphasized in the preceding examples the formation of tire treads, the high Mooney rubber mixtures are also applicable to the production of tire carcass stocks which have an advantage not only in economy but in that they are more efficient and develop less heat upon flexing at elevated temperatures than the stocks made from the usual synthetic rubbers. An example of a suitable carcass compound is as follows:

Example 4

| | |
|---|---|
| Polymer 120 ML 4 | 100 |
| Sundex 53 [1] | 30 |
| Philblack A | 50 |
| "Koresin" (reaction product of p-tertiary testing butyl phenol and acetylene) | 10 |
| BLE [1] | 1 |
| Zinc oxide | 3 |
| Sulfur | 2 |
| Altax [2] | 1.2 |
| Monex [3] | 0.3 |

[1] Defined previously.
[2] Benzothiazyl disulfide.
[3] Tetramethylthiuram monosulfide.

The above compound is mixed the same way as is the tread compound in the preceding examples. The carbon black used is a high modulus furnace black. No difficulty is had as in GR–S rubber with incorporating the required amount of Koresin to obtain tackiness. The compounded Mooney of the stock is less than 60 and is suitable for application to a rayon cord fabric. Tire carcasses are constructed therefrom in the ordinary manner except that the above compound may be used with treads of various compositions.

The high Mooney oil mixtures of the present invention may also be combined with natural rubber to produce compounds also suitable for the preparation of tire carcasses. The following example in which parts are also by weight illustrates such compounds:

Example 5

| | |
|---|---|
| Polymer 120 ML 4 | 66.6 |
| Natural rubber | 33.3 |
| Sundex 53 | 20 |
| Philblack A | 50 |
| BLE | 1 |
| Zinc oxide | 5 |
| Sulfur | 2.25 |
| Altax (accelerator) | 1.0 |
| Monex (accelerator) | 0.2 |
| Stearic acid | 2 |

In mixing the above the oil is mixed with the 120 Mooney polymer and after it is absorbed, this polymer is mixed with the natural rubber and the BLE. The black is then added and the mixing continued until the materials go together. The additional ingredients are added in a separate mix. The compound in the preceding example is used in the construction of tire carcasses.

While the present invention is primarily directed to the production of tires and the production of rubber oil mixes (masterbatches) or rubber oil carbon black masterbatches which may be later used for the production of high quality rubber tires, the advantages of the high Mooney rubber-oil or plasticizer mixes is also useful in the various fields.

It is again emphasized that the plasticizers are not equivalent however for all purposes. The hydrocarbon and general purpose high Mooney synthetic rubbers are most compatible with the hydrocarbon oils, mineral rubber, Cardolite and plasticizer mixtures comprising hydrocarbon plasticizers particularly when they have an aromatic content.

When in the above example the Sundex 53 or hydrocarbon rubber is substituted by Cardolite, substantially the same properties are obtained in regard to wear, flexing and the like, and in addition far superior properties at low temperature are obtainable.

The rubber compounds when cured into rubber articles provide rubber articles having flexibility suitable for use in the arctic regions where the butadiene or isoprene base synthetic rubbers, of which we are aware, are not capable of functioning properly.

The present invention which utilizes Cardolite as at least part of the compounding oil permits one to tailor-make the rubber for the particular locality where it is to be used. If the rubber article is to be used only in semi-arctic regions, mixtures of Cardolite or oil as above described may be utilized with increased saving of the more expensive oily component.

The Cardolite permits one to use even in tires rubbery copolymers of butadiene and styrene having various styrene and butadiene ratios. Rubbers made tough or hard by selection of monomers say of butadiene and styrene so that they are quite hard at room temperature may be used for high flexible rubber articles when compounded with Cardolite. For example rubbers in which the relatively high toughness or hardness is obtained by selection of the monomers so that they contain as high as 90% styrene with 10 parts of butadiene when mixed with Cardolite become highly flexible and may be used for tread compounds and the like particularly when mixed with a lower styrene rubber.

While these rubbers are not efficient at low temperatures if the temperature is raised their efficiency greatly increases. The Cardolite is found to lower tremendously the second order transition of rubbers when present in amounts such that the total Cardolite content is at least 35 or more.

While Cardolite is the most available and practical lower alkyl ether of a long chain aliphatic phenol and is characterized by being the ethyl ether of an aliphatic phenol having the general formula, $C_{14}H_{27} \cdot C_6H_4OH$, other lower aliphatic ethers of Cardinol including methyl ether, the propyl and isopropyl ethers, butyl ethers and hexyl ethers of Cardinol may also be used to produce desirable compounds. As the alkyl group of the ether is increased in length or in molecular weight, the low temperature properties of the rubber compound become somewhat poorer. When the length of the alkyl group is greater than 8 carbon atoms most of the specific advantages of the alkyl ethers of Cardinol become lost.

The present invention effects great economies in the amount of synthetic rubbers utilized. It is largely possible because of the difference in character between synthetic rubbers and natural rubber, the different breakdown characteristics and the toughness of character inherent in the polymer.

What we claim is:

1. A vulcanizable rubber compound comprising a mixture of a solid non-oil-resistant, hydrocarbon-oil-compatible hydrocarbon polymerization product of a conjugated diolefine of less than 8 aliphatic carbon atoms and a compatible plasticizer the major portion of which is an ether of a lower alkyl alcohol of less than 9 carbon atoms and of a substituted phenol found in cashew nut shell oil, said phenol having a long chain aliphatic substituent connected to the benzene nucleus by carbon to carbon bonds and having the general formula $$C_{14}H_{27}C_6H_4OH$$

said ether being present in the amount of 30–250% of the weight of said polymerization product and said polymerization product having a "computed Mooney" viscosity of at least 115.

2. A product according to claim 1 wherein the said solid polymerization product has a "computed Mooney" viscosity of at least 115 and the amount of liquid plasticizer present is at least 30% of the weight of said polymerization product.

3. A rubber compound comprising a hydrocarbon polymerization product of a conjugated diolefine of less than 8 carbon atoms which polymerization product is compatible with hydrocarbon oils and is characterized by having a "computed Mooney" viscosity of at least 90, and a compatible plasticizer, the major portion of which is an ether of an alkyl alcohol not in excess of 8 carbon atoms and of a phenol found in cashew nut shell oil having a long chain aliphatic substituent connected to the benzene nucleus by carbon to carbon bonds, the total amount of plasticizing material in said compound being at least 30% of the weight of said polymerization product.

4. A molded rubber article comprising a compound according to claim 3.

5. A rubber compound according to claim 1 wherein the conjugated polymerization product is a copolymer of a styrene and a conjugated diolefin of less than 8 carbon atoms.

6. A rubber compound according to claim 3 wherein said aliphatic substituent is an unsaturated hydrocarbon group.

7. A rubber compound according to claim 3 wherein the "computed Mooney" viscosity thereof is at least 115.

References Cited in the file of this patent

UNITED STATES PATENTS

| | | |
|---|---|---|
| 2,284,369 | Caplan | May 26, 1942 |
| 2,409,277 | Harvey | Oct. 15, 1946 |

OTHER REFERENCES

"Industrial and Engineering Chemistry," May 1948, pages 769–777.